(12) United States Patent
Betzner

(10) Patent No.: US 7,228,744 B2
(45) Date of Patent: *Jun. 12, 2007

(54) PRESSURE TRANSDUCER FOR GASEOUS HYDROGEN ENVIRONMENT

(75) Inventor: Timothy M. Betzner, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/125,062

(22) Filed: May 9, 2005

(65) Prior Publication Data

US 2006/0248958 A1 Nov. 9, 2006

(51) Int. Cl.
*G01L 9/00* (2006.01)

(52) U.S. Cl. .............................. 73/754; 73/715; 73/753

(58) Field of Classification Search .......... 73/700–756; 361/283.1–283.4
See application file for complete search history.

(56) References Cited

U.S. PATENT DOCUMENTS

| | | | |
|---|---|---|---|
| 5,220,838 A | | 6/1993 | Fung et al. |
| 5,287,746 A | * | 2/1994 | Broden ..................... 73/706 |
| 5,522,267 A | * | 6/1996 | Lewis ....................... 73/726 |
| 5,661,245 A | | 8/1997 | Svoboda et al. |
| 6,122,973 A | * | 9/2000 | Nomura et al. ............ 73/724 |
| 6,568,274 B1 | * | 5/2003 | Lucas et al. ............... 73/718 |
| 6,893,907 B2 | * | 5/2005 | Maydan et al. ............ 438/149 |
| 6,991,687 B2 | * | 1/2006 | Poor et al. ................. 148/235 |
| 2002/0019711 A1 | | 2/2002 | Miyashita et al. | |

FOREIGN PATENT DOCUMENTS

| | | |
|---|---|---|
| DE | 26 30 640 | 1/1977 |
| EP | 0 553 725 | 8/1993 |
| EP | 1 126 260 | 8/2001 |

OTHER PUBLICATIONS

EP Search Report dated Aug. 18, 2006.
Ghezzi F et al: "Problems of determing true equilibrium pressures of hydrogen getters over a wide range of getter temperature and hydrogen sorption" Journal of Vaccum Science and Technology A. Vaccum, Surfaces and Films, American Institute of Physics, New York, NY, US, vol. 17, No. 6, Nov. 1999, pp. 3452-2462, XP012004883 ISSN: 0734-2101 abstract p. 3452, left-hand column, line 1—right-hand column, paragraph 3.

* cited by examiner

*Primary Examiner*—Edward Lefkowitz
*Assistant Examiner*—Jermaine Jenkins
(74) *Attorney, Agent, or Firm*—Jimmy L. Funke

(57) ABSTRACT

A silicon-based hydrogen pressure sensor module incorporates a low temperature cofired ceramic (LTCC) substrate that shields the cavity formed by the silicon membrane and cell body from hydrogen permeation. A bossed container filled with an oil material is mounted on the substrate and houses a sensor cell. The oil material may be impregnated with a hydrogen getter material.

20 Claims, 2 Drawing Sheets

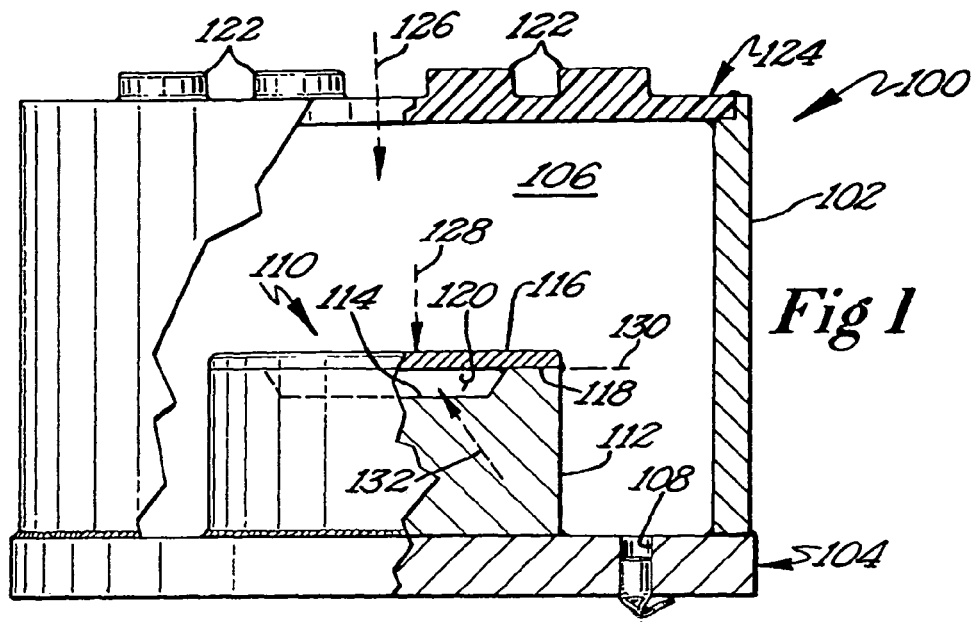
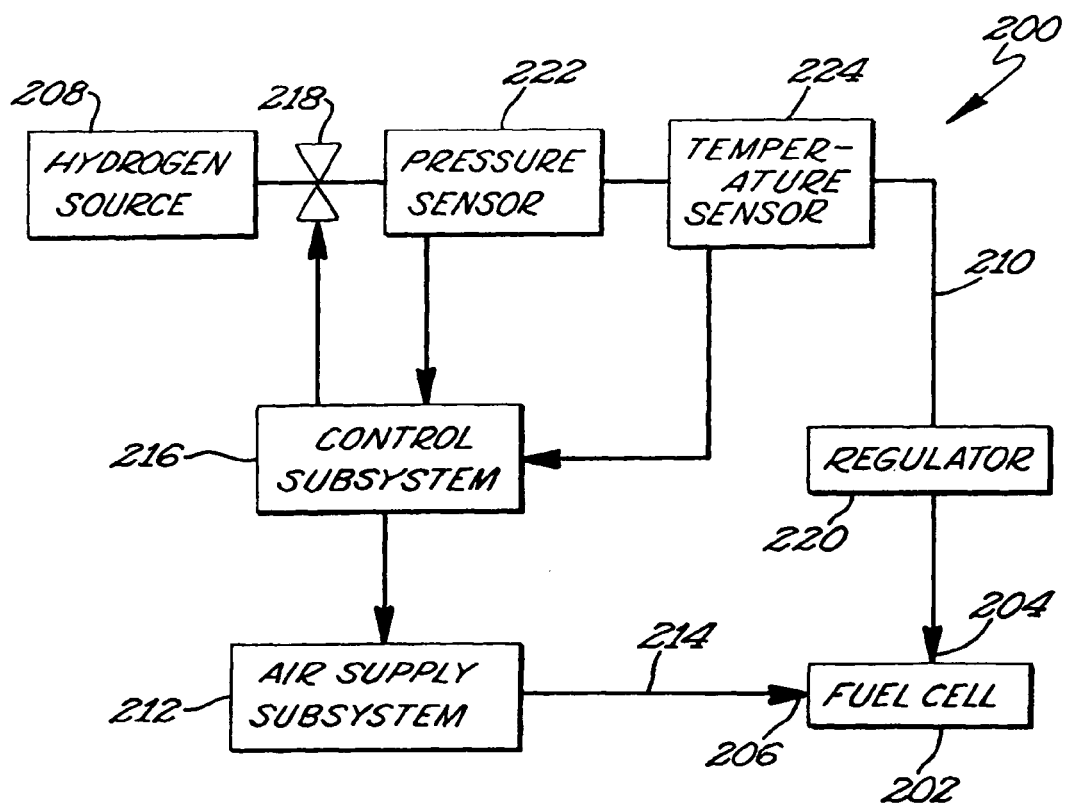

PRESSURE TRANSDUCER FOR GASEOUS HYDROGEN ENVIRONMENT

TECHNICAL FIELD

This disclosure relates generally to pressure sensors. More particularly, this disclosure relates to pressure sensors for use in hydrogen-rich environments.

BACKGROUND OF THE DISCLOSURE

Certain vehicle control systems involve measuring pressure parameters, such as engine oil pressure, fuel pressure, transmission fluid pressure, or brake pressure. Silicon-based pressure sensors, for example, are used in a wide variety of automotive applications, including sensing manifold absolute pressure (MAP), turbo intake air pressure, and differential fuel vapor pressure. In addition, some occupant detection systems incorporate silicon-based pressure sensors.

Some silicon-based pressure sensors, known as absolute silicon-based pressure sensors, work by sensing a differential pressure across a thin silicon membrane or diaphragm within a cell body. The silicon membrane and cell body form a cavity that is hermetically sealed under a vacuum. This cavity establishes a reference pressure on one side of the membrane. The pressure sensor outputs a voltage that is proportional to the difference in pressure between the sensed pressure and the reference pressure. To provide acceptable service, the cell body and corresponding package must be able to withstand the environment.

For absolute pressure sensing applications involving hydrogen gas media, for example, in proton exchange membrane (PEM) hydrogen fuel cells, it can be difficult for the silicon membrane of the pressure sensor to maintain a differential pressure. In particular, maintaining a reference vacuum in the cavity formed by the silicon membrane and the cell body is difficult because hydrogen diffuses or permeates through the silicon. The rate at which this diffusion or permeation occurs, known as the diffusion rate or the permeation rate, can be significant over long periods of time at temperatures commonly found in automotive environments. As a result, the reference vacuum can fill with hydrogen over time. When the reference vacuum fills with hydrogen, the accuracy of the absolute pressure sensor can deviate from acceptable limits.

SUMMARY OF VARIOUS EMBODIMENTS

According to various example embodiments, a silicon-based hydrogen pressure sensor module incorporates a substrate formed from a low temperature cofired ceramic (LTCC) or other suitable material. A container filled with an incompressible liquid, such as oil, is mounted on the substrate and houses a sensor cell. In some embodiments, the oil is impregnated with a hydrogen getter material or has high intrinsic hydrogen gettering properties. The substrate or the container, or both, shields the cavity formed by the silicon membrane and cell body from hydrogen permeation.

One embodiment is directed to a sensor assembly having a ceramic substrate. A container is located on the ceramic substrate. The container and the ceramic substrate define a container volume. A sensor cell is located within the container volume. The sensor cell comprises a sensor handle wafer and a diaphragm proximate the sensor handle wafer. The sensor cell defines a reference cavity. A substantially incompressible liquid is disposed within the container volume. The substantially incompressible liquid comprises a hydrogen getter material.

In another embodiment, a pressure sensor arrangement includes a ceramic substrate and a container located on the ceramic substrate. The container has a boss formed on a surface of the container. The container and the ceramic substrate define a container volume. A silicon pressure sensor handle wafer is located within the container volume. A silicon diaphragm is located within the container volume and is attached to the silicon pressure sensor handle wafer so as to define a reference cavity located between the silicon diaphragm and the silicon pressure sensor handle wafer. An oil material comprising a hydrogen getter material is disposed within the container volume. The pressure sensor arrangement may be incorporated in a fuel cell system including a fuel cell and a hydrogen source in gaseous communication with the fuel cell via a hydrogen supply path. A control subsystem is configured to regulate the flow of hydrogen to the fuel cell via the hydrogen supply path.

Another embodiment is directed to a method for manufacturing a plurality of sensor assemblies. A substrate material is provided. A plurality of containers are located on the substrate material in an array arrangement. The containers and the substrate material define a plurality of container volumes. A sensor cell is formed within each container volume. Each sensor cell comprises a sensor handle wafer and a diaphragm proximate the sensor handle wafer. The sensor cell defines a reference cavity. A plurality of ports are formed in the substrate material. A substantially incompressible liquid is introduced within the container volumes via the ports. The substantially incompressible liquid comprises a hydrogen getter material. In this way, the plurality of sensor assemblies are formed in the array arrangement.

Various embodiments may provide certain advantages. For example, the container may reduce hydrogen permeation to the reference cavity. In addition, the hydrogen getter-impregnated oil filling the container volume may further reduce hydrogen permeation, while transferring pressure from the bossed can surface to the diaphragm. With hydrogen permeation reduced, the performance of the pressure sensor can be maintained within acceptable limits.

Additional objects, advantages, and features will become apparent from the following description and the claims that follow, considered in conjunction with the accompanying drawings.

BRIEF DESCRIPTION OF THE DRAWINGS

FIG. 1 is a sectional view illustrating an example sensor assembly according to an embodiment.

FIG. 2 is a block diagram illustrating an example fuel cell system according to another embodiment.

DESCRIPTION OF VARIOUS EMBODIMENTS

Figure 3:
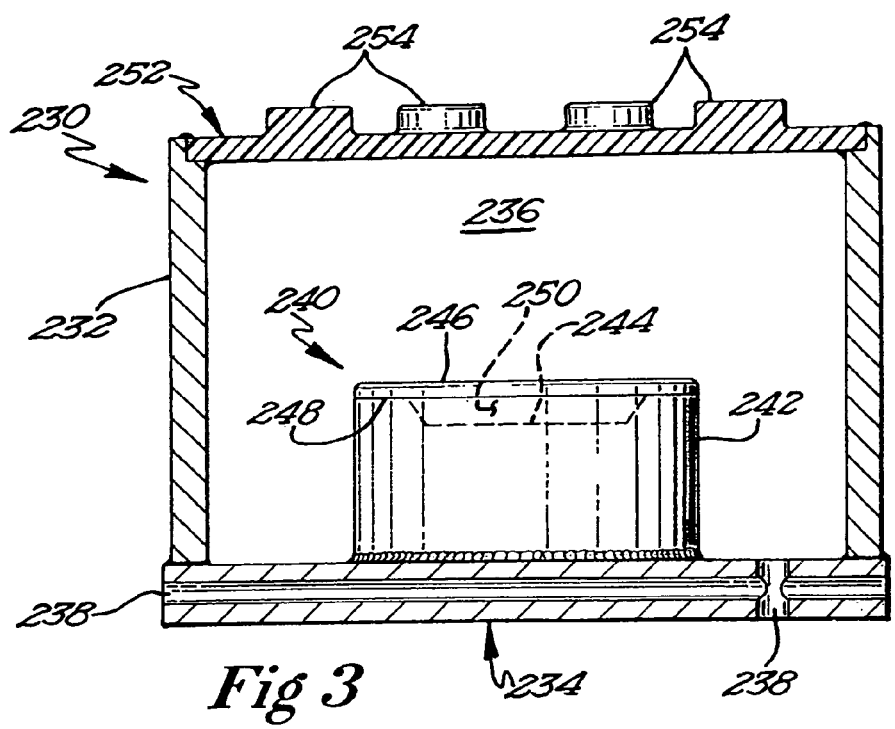
FIG. 3 is a sectional view illustrating an example sensor assembly according to yet another embodiment.

A silicon-based hydrogen pressure sensor module incorporates a substrate formed from a low temperature cofired ceramic (LTCC) or other suitable material. A container filled with an incompressible liquid, such as oil, is mounted on the substrate and houses a sensor cell. In some embodiments, the oil material is impregnated with a hydrogen getter material or has high intrinsic hydrogen gettering properties. The substrate or the container, or both, shields the reference cavity formed by the silicon membrane and cell body from hydrogen permeation.

Hydrogen permeation to the reference cavity may be reduced in a number of ways. For example, the container may reduce hydrogen permeation to the reference cavity. In addition, the hydrogen getter-impregnated oil filling the container volume may further reduce hydrogen permeation, while transferring pressure from the can surface to the diaphragm. With hydrogen permeation reduced, the performance of the pressure sensor can be maintained within acceptable limits.

In the following description, numerous specific details are set forth in order to provide a thorough understanding of various embodiments. It will be apparent to one skilled in the art that the described embodiments may be practiced without some or all of these specific details. In other instances, for purposes of brevity, well-known components and process steps have not been described in detail.

For purposes of this description, terms such as "upper," "lower," "right," "left," "rear," "front," "vertical," "horizontal," and the like relate to the embodiment as illustrated and oriented in FIG. 1. It is to be understood that various embodiments may assume alternative orientations, except where expressly specified to the contrary. It is also to be understood that specific devices and processes are described in this disclosure by way of illustration only, and are not intended to be limiting. For example, specific dimensions and other physical characteristics relating to the embodiments described in this disclosure are not to be considered as limiting, unless the claims expressly state otherwise.

Referring now to the drawings, FIG. 1 illustrates an example hydrogen pressure sensor assembly 100 according to one embodiment. The hydrogen pressure sensor assembly 100 may measure pressures in any of a variety of ranges, including, for example, a manifold absolute pressure (MAP) range up to about 1 atmosphere, a turbo pressure range from about 1–5 atmospheres, and higher pressures, upwards of about 700 atmospheres. The hydrogen pressure sensor assembly 100 includes a stainless steel can 102 mounted on a substrate 104. In some embodiments, the can 102 may be formed from another appropriate metal, such as aluminum or alloy 42. The substrate 104 may be formed from a ceramic material such as a low temperature cofired ceramic (LTCC), a polymer-based material such as FR-4, or other suitable material. In some embodiments, the can 102 is soldered to the substrate 104. Those of skill in the art will appreciate that the can 102 may be bonded to the substrate 104 by other means, for example, using any of a variety of adhesives and epoxies. These adhesives and epoxies may be either electrically conductive or electrically nonconductive.

The can 102 and the substrate 104 define a container volume 106. During manufacture, an incompressible liquid, for example, silicone or other oil, is introduced into the container volume 106 through a port 108. Other oil materials that can be used include, but are not limited to, fluorinated oil, low-temperature oil, and biocompatible oils. The oil material is suitable for use in hydrogen-rich environments and provides general media compatibility. The port 108 can be formed in the substrate 104, as shown in FIG. 1, or can be formed on a wall of the can 102. The oil material may be introduced into the container volume 106, for example, using a pinched and welded filling tube or other filling mechanism. Other filling mechanisms may involve horizontal and vertical port arrangements formed in the substrate 104 that allow the oil to be provided in plate form to many cells simultaneously, e.g., in an array or many-up manufacturing configuration.

In this way, an array, or many-up, manufacturing configuration can be realized. This type of manufacturing configuration facilitates the simultaneous manufacture of hydrogen pressure sensors in a manner analogous to the manufacture of silicon wafers containing many dies arranged in an array-like configuration. According to certain embodiments, hydrogen pressure sensors manufactured in a many-up configuration using LTCC or another suitable substrate material are subjected to hydrogen pressure testing in a many-up configuration on the manufacturing line.

A sensor cell 110 is located within the container volume 106. The sensor cell includes a hydrogen pressure sensor handle wafer 112, which may be implemented, for example, as a silicon piezoresistive pressure sensor or other suitable pressure sensor. A depression is formed on a surface 114 of the hydrogen pressure sensor handle wafer 112. A silicon piezoresistive diaphragm 116 is bonded or otherwise attached to the hydrogen pressure sensor handle wafer 112 at interfaces 118. The diaphragm 116 and the hydrogen pressure sensor handle wafer 112 define a reference cavity 120, which is formed as a vacuum.

To maintain the performance of the diaphragm 116 within acceptable limits, it is important that the reference cavity 120 be at least substantially preserved as a vacuum. In conventional pressure sensors, the vacuum of the reference cavity can be compromised by hydrogen permeation. By contrast, the pressure sensor assembly 100 illustrated in FIG. 1 protects the reference cavity 120 from hydrogen permeation via a number of routes, which are indicated by dotted arrows in FIG. 1. For example, bosses 122 significantly decrease the hydrogen permeation rate through a top surface 124 of the can 102 via a route 126.

In some embodiments, the oil material has high intrinsic hydrogen-gettering properties or is impregnated with a hydrogen getter material, such as a suitable palladium alloy or a commercially available hydrogen getter material. The hydrogen getter material absorbs some of the hydrogen that does pass through the top surface 124 of the can 102. In this way, the hydrogen getter material decreases the hydrogen permeation rate through the diaphragm 116 via a route 128. The hydrogen getter material also decreases the hydrogen permeation rate along the interface 118 between the diaphragm 116 and the hydrogen pressure sensor handle wafer 112 via a route 130. Further, the hydrogen getter material also decreases the hydrogen permeation rate through the diaphragm 116 itself via a route 132. As a result, the getter-impregnated oil material significantly retards the permeation of hydrogen into the reference cavity 120 via routes 126, 128, 130, and 132, thereby substantially preserving the integrity of the vacuum in the reference cavity 120 and prolonging the useful life of the pressure sensor assembly 100.

As disclosed above, the substrate 104 may be formed from LTCC. LTCC is suitable for use in high pressure and hydrogen-rich environments. Additionally, using LTCC facilitates adding integrated circuit (IC) components, discrete components, and internal components such as buried capacitors or internal cavities and channels, i.e., plumbing. Alternatively, the substrate 104 may be formed from a ceramic, polymer-based FR-4, or some other suitable material. While not illustrated in FIG. 1, the substrate 104 may be populated by discrete components, integrated circuit (IC) components, or both to create a one-piece module suitable for use in high pressures and other harsh environments.

FIG. 2 is a block diagram illustrating an example fuel cell system 200 incorporating the hydrogen pressure sensor assembly 100 of FIG. 1. A fuel cell 202 generates the power that is provided by the fuel cell system 200. The fuel cell 202 may be implemented, for example, as a proton exchange membrane fuel cell (PEMFC), and has an anode 204 and a cathode 206. Hydrogen is supplied to the anode 204 from a hydrogen source 208, such as a pressurized hydrogen tank, via a hydrogen supply path 210. Oxygen is supplied to the cathode 206 from an oxygen source, such as an air supply subsystem 212, via an oxygen supply path 214.

A control subsystem 216 controls the delivery of hydrogen and oxygen to the fuel cell 202. In particular, the control subsystem 216 controls the delivery of hydrogen to the anode 204 by operation of a cutoff valve 218. A regulator 220 further controls the delivery of hydrogen to the anode 204 to ensure that the pressure of the hydrogen at the output of the regulator 220 is within a prescribed range of pressures.

A pressure sensor 222 is located along the hydrogen supply path 210 and measures the pressure of hydrogen flowing through the hydrogen supply path 210. The pressure sensor 222 may incorporate the pressure sensor assembly 100, which is described in greater detail above in connection with FIG. 1. A temperature sensor 224 is also located along the hydrogen supply path 210 and measures the temperature of the hydrogen flowing through the hydrogen supply path 210.

The control subsystem 216 receives signals from the pressure sensor 222 and the temperature sensor 224 indicating the pressure and temperature, respectively, of the hydrogen gas flowing through the hydrogen supply path 210. The control subsystem 216 adjusts the flow of hydrogen gas as appropriate by controlling the operation of the cutoff valve 218.

FIG. 1 illustrates a general absolute pressure sensor assembly. However, other types of sensors can be implemented using the principles disclosed herein. For example, a differential hydrogen pressure sensor can be implemented by using a differential silicon pressure sensor cell that has appropriate ports formed in the pressure sensor assembly. Such ports may include, for example, a port similar to the port 108 shown in FIG. 1.

FIG. 3 is a sectional view illustrating an example hydrogen pressure sensor assembly 230 according to another embodiment. The hydrogen pressure sensor assembly 230 includes a stainless steel can 232 mounted on a substrate 234. In some embodiments, the can 232 may be formed from another appropriate metal, such as aluminum or alloy 42. The substrate 234 may be formed from a ceramic material such as LTCC, a polymer-based material such as FR-4, or another suitable material. In some embodiments, the can 232 is soldered to the substrate 234. Those of skill in the art will appreciate that the can 232 may be bonded to the substrate 234 by other means, for example, using any of a variety of adhesives and epoxies. These adhesives and epoxies may be either electrically conductive or electrically nonconductive.

The can 232 and the substrate 234 define a container volume 236. During manufacture, an oil, such as silicone, is introduced into the container volume 236 through a port 238. Other oils that can be used include, but are not limited to, fluorinated oil, low-temperature oil, and biocompatible oils. The oil is suitable for use in hydrogen-rich environments and provides general media compatibility.

In some embodiments, the oil material has high intrinsic hydrogen-gettering properties or is impregnated with a hydrogen getter material, such as a suitable palladium alloy or a commercially available hydrogen getter material. The intrinsically hydrogen-gettering or getter-impregnated oil material significantly retards the permeation of hydrogen into the reference cavity, thereby substantially preserving the integrity of the vacuum in the reference cavity and prolonging the useful life of the hydrogen pressure sensor assembly 230. In the embodiment depicted in FIG. 3, an internal plumbing system of substantially orthogonal ports 238 is formed in the substrate 234. This arrangement of ports 238 is suitable for manufacturing multiple pressure sensor assemblies 230 in an array or many-up manufacturing configuration because it allows the oil to be introduced into multiple pressure sensor assemblies 230 from a single source. The oil may be introduced into the container volume 236, for example, using a pinched and welded filling tube or other filling mechanism.

In this way, an array, or many-up, manufacturing configuration can be realized. This type of manufacturing configuration facilitates the simultaneous manufacture of pressure sensors in a manner analogous to the manufacture of silicon wafers containing many dies arranged in an array-like configuration. According to certain embodiments, hydrogen pressure sensors manufactured in a many-up configuration using LTCC or another suitable substrate material are subjected to pressure testing in a many-up configuration on the manufacturing line.

A sensor cell 240 is located within the container volume 236. The sensor cell includes a pressure sensor handle wafer 242, which may be implemented, for example, as a silicon piezoresistive pressure sensor or other suitable pressure sensor. A depression is formed on a surface 244 of the pressure sensor handle wafer 242. A diaphragm 246 is bonded or otherwise attached to the pressure sensor handle wafer 242 at interfaces 248. The diaphragm 246 and the pressure sensor handle wafer 242 define a reference cavity 250, which is formed as a vacuum.

To maintain the performance of the diaphragm 246 within acceptable limits, the diaphragm 246 may be protected from potential adverse effects of high pressure, as well as hydrogen-rich environments. In particular, the can 232 may have a top surface 252 that incorporates a flexible membrane that deflects under pressure. By controlling the surface area and thickness of the flexible membrane, the diaphragm 246 can be configured to measure a wide range of pressures.

In addition, while not required, one or more bosses 254 may be formed on the top surface 252. The bosses 254 may be used to help control the response of the top surface 252 to pressure. The oil in the container volume 236 provides the mechanism for transferring the pressure from the top surface 252 to the diaphragm 246. This arrangement may be compatible with difficult sensing environments, such as environments in which brake fluid pressure is sensed. The can 232 protects the diaphragm 246 from harsh effects of the environment, while the controlled response of the top surface 252 and the oil in the container volume 236 allow the pressure of the environment to be sensed. The oil also protects the diaphragm 246 from harsh media by reducing or eliminating direct exposure of the diaphragm 246 to the media.

As disclosed above, the substrate 234 may be formed from LTCC. LTCC is suitable for use in high pressure, as well as hydrogen-rich environments. Additionally, using LTCC facilitates adding IC components, discrete components, and internal components such as buried capacitors or internal cavities and channels, i.e., plumbing. Alternatively, the substrate 234 may be formed from a ceramic, FR-4, or some other suitable material. While not illustrated in FIG. 3, the substrate 234 may be populated by discrete components, IC components, or both to create a one-piece module suitable for use in high pressures and hydrogen-rich environments.

Figure 4:
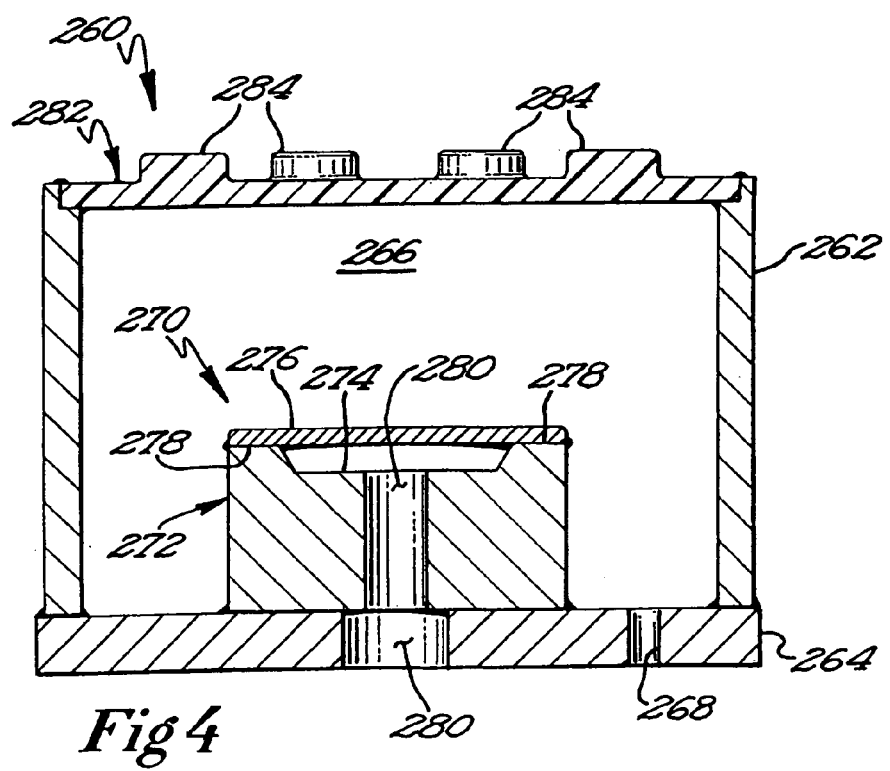
FIG. 4 is a sectional view illustrating an example sensor assembly according to still another embodiment.

FIG. 4 is a sectional view illustrating an example differential hydrogen pressure sensor assembly 260 according to yet another embodiment. The differential hydrogen pressure sensor assembly 260 includes a stainless steel can 262 mounted on a substrate 264. In some embodiments, the can 262 may be formed from another appropriate metal, such as aluminum or alloy 42. The substrate 264 may be formed from LTCC or another ceramic material, FR-4, or another suitable material. In some embodiments, the can 262 is soldered to the substrate 264. Those of skill in the art will appreciate that the can 262 may be bonded to the substrate 264 by other means, for example, using any of a variety of adhesives and epoxies. These adhesives and epoxies may be either electrically conductive or electrically nonconductive.

The can 262 and the substrate 264 define a container volume 266. During manufacture, an oil, such as silicone, is introduced into the container volume 266 through a port 268. Other oils that can be used include, but are not limited to, fluorinated oil, low-temperature oil, and biocompatible oils. The oil is suitable for use in high pressure and hydrogen-rich environments and provides general media compatibility. The oil may be introduced into the container volume 266, for example, using a pinched and welded filling tube or other filling mechanism. In some embodiments, the oil material has high intrinsic hydrogen-gettering properties or is impregnated with a hydrogen getter material, such as a suitable palladium alloy or a commercially available hydrogen getter material. The intrinsically hydrogen-gettering or getter-impregnated oil material significantly retards the permeation of hydrogen into the reference cavity, thereby substantially preserving the integrity of the vacuum in the reference cavity and prolonging the useful life of the differential hydrogen pressure sensor assembly 260.

A sensor cell 270 is located within the container volume 266. The sensor cell includes a pressure sensor handle wafer 272, which may be implemented, for example, as a silicon piezoresistive pressure sensor or other suitable pressure sensor. A depression is formed on a surface 274 of the pressure sensor handle wafer 272. A diaphragm 276 is bonded or otherwise attached to the pressure sensor handle wafer 272 at interfaces 278. A differential port 280 is formed within the pressure sensor handle wafer 272 and the substrate 264 and beneath the diaphragm 276. In operation, the differential pressure sensor assembly 260 measures the differential pressure between the ambient environment and another environment in communication with the differential port 280.

To maintain the performance of the diaphragm 276 within acceptable limits, the diaphragm 276 may be protected from potential adverse effects of high pressure, as well as hydrogen-rich environments. In particular, the can 272 may have a top surface 282 that incorporates a flexible membrane that deflects under pressure. By controlling the surface area and thickness of the flexible membrane, the diaphragm 276 can be configured to measure a wide range of pressures.

In addition, while not required, one or more bosses 284 may be formed on the top surface 282. The bosses 284 may be used to help control the response of the top surface 282 to pressure. The oil in the container volume 266 provides the mechanism for transferring the pressure from the top surface 282 to the diaphragm 276. This arrangement may be compatible with difficult sensing environments, such as environments in which brake fluid pressure is sensed. The can 262 protects the diaphragm 276 from harsh effects of the environment, while the controlled response of the top surface 282 and the oil in the container volume 266 allow the pressure of the environment to be sensed. The oil also protects the diaphragm 276 from harsh media by reducing or eliminating direct exposure of the diaphragm 276 to the media.

As disclosed above, the substrate 264 may be formed from LTCC. LTCC is suitable for use in hydrogen-rich and high pressure environments. Additionally, using LTCC facilitates adding IC components, discrete components, and internal components such as buried capacitors or internal cavities and channels, i.e., plumbing. Alternatively, the substrate 264 may be formed from a ceramic, FR-4, or some other suitable material. While not illustrated in FIG. 4, the substrate 264 may be populated by discrete components, IC components, or both to create a one-piece module suitable for use in high pressures and hydrogen-rich environments.

As demonstrated by the foregoing discussion, various embodiments may provide certain advantages. Hydrogen permeation to the reference cavity may be reduced in a number of ways. For example, the bossed container may reduce hydrogen permeation to the reference cavity. In addition, the hydrogen getter-impregnated oil filling the container volume may further reduce hydrogen permeation, while transferring pressure from the bossed can surface to the diaphragm. With hydrogen permeation reduced, the performance of the pressure sensor can be maintained within acceptable limits. Thus, the electrical components of the pressure sensor can be protected from potential adverse effects from a hydrogen fuel cell environment.

It will be understood by those skilled in the art that various modifications and improvements may be made without departing from the spirit and scope of the disclosed embodiments. The scope of protection afforded is to be determined solely by the claims and by the breadth of interpretation allowed by law.

What is claimed is:

1. A sensor assembly comprising:
   a ceramic substrate;
   a container located on the ceramic substrate, the container and the ceramic substrate defining a container volume;
   a sensor cell located within the container volume, the sensor cell comprising a sensor handle wafer and a diaphragm located proximate the sensor handle wafer, the sensor cell defining a reference cavity; and
   a substantially incompressible liquid disposed within the container volume, the substantially incompressible liquid comprising a hydrogen getter material.

2. The sensor assembly of claim 1, wherein the substantially incompressible liquid comprises an oil material selected from the group consisting of silicone, fluorinated oil, low-temperature oil, and a biocompatible oil, and wherein the oil material is impregnated with the hydrogen getter material.

3. The sensor assembly of claim 1, wherein the substantially incompressible liquid has high intrinsic hydrogen gettering properties.

4. The sensor assembly of claim 1, wherein the container comprises a can formed from a metal selected from the group consisting of stainless steel, aluminum, and alloy 42.

5. The sensor assembly of claim 1, wherein the ceramic substrate is formed from a low temperature cofired ceramic (LTCC) material.

6. The sensor assembly of claim 1, wherein the ceramic substrate defines a port for introducing the oil material into the container volume.

7. The sensor assembly of claim 1, wherein the container defines a port for introducing the oil material into the container volume.

8. The sensor assembly of claim 1, wherein the sensor cell comprises a hydrogen-hardened silicon pressure cell.

9. The sensor assembly of claim 1, wherein the container has a boss formed on a surface of the container.

10. The sensor assembly of claim 1, wherein the sensor assembly comprises a differential pressure sensor.

11. A pressure sensor arrangement comprising:
a ceramic substrate;
a container located on the ceramic substrate and having a boss formed on a surface of the container, the container and the ceramic substrate defining a container volume;
a silicon pressure sensor handle wafer located within the container volume;
a silicon diaphragm located within the container volume and attached to the silicon pressure sensor handle wafer so as to define a reference cavity located between the silicon diaphragm and the silicon pressure sensor handle wafer; and
an oil material disposed within the container volume, the oil material comprising a hydrogen getter material.

12. The pressure sensor arrangement of claim 11, wherein the oil material is selected from the group consisting of silicone, fluorinated oil, low-temperature oil, and a biocompatible oil, and wherein the oil material is impregnated with the hydrogen getter material.

13. The pressure sensor arrangement of claim 11, wherein the oil material has high intrinsic hydrogen gettering properties.

14. The pressure sensor arrangement of claim 11, wherein the container comprises a can formed from a metal selected from the group consisting of stainless steel, aluminum, and alloy 42.

15. The pressure sensor arrangement of claim 11, wherein the ceramic substrate is formed from a low temperature cofired ceramic (LTCC) material.

16. The pressure sensor arrangement of claim 11, wherein the ceramic substrate defines a port for introducing the oil material into the container volume.

17. The pressure sensor arrangement of claim 11, wherein the container defines a port for introducing the oil material into the container volume.

18. The pressure sensor arrangement of claim 11, wherein the silicon pressure sensor handle wafer comprises a hydrogen-hardened silicon pressure cell.

19. The pressure sensor arrangement of claim 11, wherein the container has a boss formed on a surface of the container.

20. The pressure sensor arrangement of claim 11, wherein the sensor assembly comprises a differential pressure sensor.

* * * * *